United States Patent Office 3,034,906
Patented May 15, 1962

3,034,906
PROCESS FOR SKINNING SQUID AND FOR THE PREPARATION OF SQUID FILLETS
Beverly E. Williams, La Grange Park, Ill., assignor to Hodges Research and Development Company, New York, N.Y., a corporation of California
No Drawing. Filed July 27, 1960, Ser. No. 45,553
3 Claims. (Cl. 99—195)

This invention relates to the processing of food products and has particular reference to a process for the preparation of squid for human consumption.

As explained in my U.S. Patent No. 2,822,274 of February 4, 1958, squid is found in various waters of the world and in quantity on the East and West Coasts of the United States. It was also pointed out in my patent that while squid is a great delicacy among certain peoples it is virtually unknown to most Americans because methods of preparation now known are not to the average American taste. Squid prepared in this country for export are generally canned or dried whole, not eviscerated, and generally not even washed or cleaned.

The body of a squid is covered with a dark, mottled membrance which is thin, film-like, sticky and gelatinous. While my patent states that this skin is easily removed with the caudal fins it has been found that the mechanical devices which have heretofore been used for this purpose do not slip or peel off the skin at a speed consistent with efficient production of the fillets. It is essential that the skin be removed from the squid because the fillet and other edible meat portions would otherwise have a dark, purplish appearance which is undesirable to our people. The skin also contains some of the ink sacs of the squid which should be removed.

As noted in my patent, after the skin is removed the body of the squid is pure white meat.

I have now found that, by the novel process to be described hereinafter, the skin can be removed from the entire body or just the "mantle," which is the side wall of the squid in a very efficient operation and may be either manually performed or performed by machine. In either case, the skin is completely removed with minimum effort.

After the skin has been removed the mantle and other edible meat portions may be trimmed to desired size and then scored to render the meat tender and capable of being cooked without undue curling or changing of the shape of the product.

Other delectible products, such as hors d'oeuvres, potato pancakes, bisques, etc., may now be made from skinned, tendered squid or meaty portions thereof.

It is therefore the objective of the present invention to provide a novel process for the efficient skinning and preparation of squid meat for human consumption.

Briefly, an embodiment of this invention comprises the discovery that the skin of the squid can be readily removed by first freezing the squid and thereafter tempering until the skin-on surface is approximately 29° F. The skin by reason of this treatment becomes almost parchment-like in strength and texture, being entirely changed from the thin, film-like, sticky and gelatinous membrane. The parchment-like skin is easily removed since freezing and tempering has been found to greatly reduce the adherence of the skin to the body of the squid. The parchment-like character of the skin is inducive to quick and ready removal of the skin by both manual and mechanical means.

After the skin has been removed the resultant white meat may then be tenderized and rendered substantially non-curling upon cooking by mechanical treatment thereof. This mechanical treatment comprises scoring the meat at more or less regular intervals which prevents objectionable curling and shrinkage upon application of heat in cooking. This scoring of the ligaments also tenderizes the meat and releases the flavor of the meat more readily upon cooking. This treatment causes the meat to swell to an increased thickness when cooked.

The cutting and scoring of the meat and especially the ligaments of the mantle may be done in the manner described in my patent or by other suitable systems of scoring which will insure severing of the ligaments as described. While my patent describes scoring in two mutually perpendicular directions to sever each ligament into lengths of approximately ⅛ to ½ inch, other types of scoring are effective as long as the meat and its ligaments are severed to prevent curling.

After scoring of the fillet, the fillet and other portions may be breaded or battered with conventional seasoning and then preferably frozen and packaged for sale in the frozen state. Of course, the fillets, for example, may be sold in unfrozen state. The application of batter and breading is not essential and the fillets and other portion-cuts may be frozen and packaged for sale in the frozen state without breading and battering so that the ultimate user may cook the product as desired.

Fillets may be prepared for the table in many ways as by cooking in deep fat at about 350° F. for about a minute and one-half or they may be cooked in a skillet with a film of fat or oil for about 2 minutes to the side. Overcooking of the fillets is to be avoided as harmful to the delicate flavor.

It should now be apparent that the object described above is obtained by the present invention.

Changes in or modifications to the above described illustrative embodiment of the present concept may now be suggested to those skilled in the art without departing from the present invention. Reference should therefore be had to the appended claims to determine the scope of the present inventive concept.

What is claimed is:
1. A process for preparing squid meat products for human consumption which are substantially tender upon heating and cooking, including the steps of freezing the skin-on squid, then tempering the surface to approximately 29° F. whereby the skin increases in strength and texture and becomes somewhat loosened, then removing the skin from the body of the squid and then cutting and scoring the ligaments and flesh of the meat.
2. A process as described in claim 1 including the step of freezing the scored squid meat product.
3. A process as described in claim 1 in which the meat is scored at intervals of approximately ⅛ to ½ inch each.

References Cited in the file of this patent
UNITED STATES PATENTS
2,822,274   Williams _____ Feb. 4, 1958